United States Patent [19]
Allen et al.

[11] Patent Number: 5,300,770
[45] Date of Patent: Apr. 5, 1994

[54] APPARATUS FOR PRODUCING A POROSITY LOG OF A SUBSURFACE FORMATION CORRECTED FOR DETECTOR STANDOFF

[75] Inventors: L. Scott Allen, Dallas; William R. Mills, Plano, both of Tex.

[73] Assignee: Mobil Oil Corporation, Fairfax, Va.

[21] Appl. No.: 927,109

[22] Filed: Aug. 10, 1992

[51] Int. Cl.$^5$ .................. G01V 5/10; G01N 23/204
[52] U.S. Cl. ............................ 250/269; 250/256; 250/262; 250/268; 250/270; 364/422; 395/11; 395/22; 395/928; 395/929
[58] Field of Search ............. 250/270, 269, 268, 262, 250/256; 364/422; 395/11, 22, 928, 929

[56] References Cited

U.S. PATENT DOCUMENTS

| | | | |
|---|---|---|---|
| 4,097,737 | 6/1978 | Wills, Jr. | 250/269 |
| 4,556,793 | 12/1985 | Allen et al. | 250/267 |
| 4,581,532 | 4/1986 | Givens et al. | 250/266 |
| 4,590,370 | 5/1986 | Mills, Jr. et al. | 250/267 |
| 4,600,858 | 7/1986 | Steinman et al. | 250/270 |
| 4,625,110 | 11/1986 | Smith, Jr. | 250/269 |
| 4,638,161 | 1/1987 | Smith, Jr. et al. | 250/269 |
| 4,692,617 | 9/1987 | Allen et al. | 250/270 |
| 4,964,087 | 10/1990 | Widrow | 367/45 |
| 4,972,082 | 11/1990 | Loomis et al. | 250/269 |
| 5,068,531 | 11/1991 | Allen et al. | 250/269 |
| 5,189,415 | 2/1993 | Shimada et al. | 340/854.6 |

OTHER PUBLICATIONS

"An Artificial Neural Network Approach to Identify the Well Test Interpretation Model:Applications" SPE 56th An. Tech. Conf. Sep. 93, Al-Kaabi et al.
"Improved Methods of Signal Processing For Pulsed Neutron Capture Logging" SPWLA 22nd Annual Logging Symposium, Jun. 23–26, 1981, Randall et al.

*Primary Examiner*—Paul M. Dzierzynski
*Assistant Examiner*—David V. Bruce
*Attorney, Agent, or Firm*—Alexander J. McKillop; George W. Hager, Jr.

[57] ABSTRACT

A borehole logging tool is lowered into a borehole traversing a subsurface formation and a neutron detector measures the die-away of nuclear radiation in the formation. Intensity signals are produced representing the die-away of nuclear radiation as the logging tool traverses the borehole A signal processor, employing at least one neural network, processes the intensity signals and produces a standoff-corrected epithermal neutron lifetime signal to correct for standoff from the borehole wall encountered by the detector as the logging tool traverses the borehole. The signal processor further generates a porosity signal from the standoff-corrected epithermal neutron lifetime signal derived from measurements in borehole models at known porosities and conditions of detector standoff. A log is generated of such porosity signal versus depth as the logging tool traverses the borehole.

14 Claims, 4 Drawing Sheets

APPARATUS FOR PRODUCING A POROSITY LOG OF A SUBSURFACE FORMATION CORRECTED FOR DETECTOR STANDOFF

BACKGROUND OF THE INVENTION

This invention relates to a borehole logging method for measuring the die-away of nuclear radiation of a subsurface formation and for correcting signals representative of the decay constants and amplitudes of the measured radiation for the effects of detector standoff from the borehole wall of the formation where such signals may vary with time, distance, or any other independent variable A log of porosity versus depth is then produced for the subsurface formation as a function of the standoff-corrected formation decay constant derived from calibrated measurements in borehole models of known porosities and conditions of detector standoff.

A borehole logging tool is conventionally used to measure the die-away of nuclear radiation in the formations surrounding a borehole. In neutron porosity logging, for example, a neutron source is utilized for bombarding the formations with fast neutrons as the logging tool is advanced through the borehole. In the course of moderation, the fast neutrons reach the epithermal energy range and thence are further moderated until they reach the thermal energy range. The populations of neutrons at the various energy levels die-away with time following primary irradiation and thus offer means of characterizing the formations. The rate of die-away of the epithermal neutron population gives a quantitative indication of the amount of hydrogenous material present in the formations which in turn is indicative of the porosities of the formations. Examples of both methods and apparatus for carrying out epithermal neutron die-away porosity logging are set forth in U.S. Pat. No. 4,097,737 to W. R. Mills, Jr., and U.S. Pat. Nos. 4,556,793 and 4,590,370 to L. S. Allen and W. R. Mills, Jr.

An article entitled "Improved Methods of Signal Processing For Pulsed Neutron Capture Logging", SPWLA Twenty Second Annual Logging Symposium, Jun. 23-26, 1981, by R. Randall and E. C. Hopkinson discusses a method of pulsed neutron capture logging to differentiate oil, gas, and saline formation water environments through casing. The method applies statistical averaging to a single exponential die-away term in the logged data to determine thermal neutron decay rate. In a still further reference, U.S. Pat. No. 4,600,838 to D. K. Steinman and L. A. Jacobson, there is described a method of thermal neutron die-away logging for overcoming excessive statistical fluctuations in the logged data, particularly in strongly absorbing formations. This method involves the determination of zero and first order moments of time during first and second discrete sequences of time gates, respectively, and the taking of the ratio of such moments to obtain a thermal neutron decay constant for the formations surrounding the logged borehole. In yet further references, U.S. Pat. No. 4,625,110 to Smith, Jr. and U.S. Pat. No. 4,638,161 to Smith, Jr. and Verbout, there is described a porosity determination utilizing a two-exponential model approach to epithermal neutron die-away. Finally, U.S. Pat. No. 4,972,082 to Loomis et al. discloses use of a modulated exponential function to provide correction of an epithermal neutron die-away measurement for the situation where the logging tool is not in good contact with the borehole wall.

In U.S. Pat. No. 5,068,531 to Allen et al. there is described both apparatus and method of improving on the characterizations provided by porosity logs when the neutron detector of the logging tool is not in contact with the formation (i.e., separation or standoff of the logging tool detector from the borehole wall). Hereinafter, such separations will be referred to as standoff, although they can arise from the logging tool pulling away from the surface of the borehole wall or from the borehole enlarging away from the logging tool. In such cases, the formation decay constant determined from the die-away of nuclear radiation measurements will be in error by the degree of effect such standoff has on the measurement. It is an object of the present invention to provide for an improved porosity log from that generated from a standoff-corrected formation decay constant in accordance with the teaching of U.S. Pat. No. 5,068,531, such that the formation may be more accurately characterized as to porosity.

SUMMARY OF THE INVENTION

The present invention is directed to a method for measuring the die-away of nuclear radiation of a subsurface formation surrounding a borehole and for correcting such measurements for the effect of logging tool detector standoff from the borehole wall of the formation so that an accurate formation porosity log may be produced.

In accordance with the present invention, a logging tool is lowered into a borehole traversing a subsurface formation of interest. A pulsed source of fast neutrons irradiates the formation surrounding the borehole with fast neutrons. At least one directionally sensitive radiation detector assembly having a neutron detector measures the die-away of secondary radiation, including moderated source neutrons, produced by the fast neutrons which return to the borehole from the irradiated formation. The radiation detector assembly is positioned to contact the surface of the borehole wall and is oriented to position the neutron detector to maximize directional sensitivity of the neutron detector to the die-away of secondary radiation from the formation at the point of contact of the radiation detector assembly with the borehole wall and to minimize directional sensitivity to the die-away of secondary radiation from the borehole fluid. Intensity signals are produced representing the die-away of secondary radiation measured by the detector as the logging tool traverses the borehole A signal processor, employing at least one neural network, processes the intensity signals and produces a standoff-corrected epithermal neutron lifetime signal to correct for standoff from the borehole wall encountered by the detector as the logging tool traverses the borehole. The signal processor further generates a porosity signal from the standoff-corrected epithermal neutron lifetime signal derived from measurements in borehole models at known porosities and conditions of detector standoff. A log is generated of such porosity signal versus depth as the logging tool traverses the borehole.

In a further aspect, the signal processor produces both two- and three-component porosity signals from among the borehole, formation, and background components of the intensity signals. The signal processor further processes the two- and three-component porosity signals and i) produces a log of the three-component porosity signal versus depth if the two-component porosity signal is less than a predetermined lower porosity limit, ii) produces a log of the two-component porosity signal versus depth if the two-component porosity signal is greater than a predetermined upper porosity limit, and iii) produces a log of an output porosity signal versus depth that is a function of the two- and three-component porosity signals if the two-component porosity signal is greater than the predetermined lower porosity limit and less than the predetermined upper porosity limit.

In a more specific aspect, the signal processor merges the two- and three-component porosity signals over the range bounded by the predetermined lower and upper porosity limits. This merging may be carried out by a smoothing function, such as a sigmoid function, based upon a weighted average of the two- and three-component porosity signals.

DESCRIPTION OF THE PREFERRED EMBODIMENT

Figure 1:
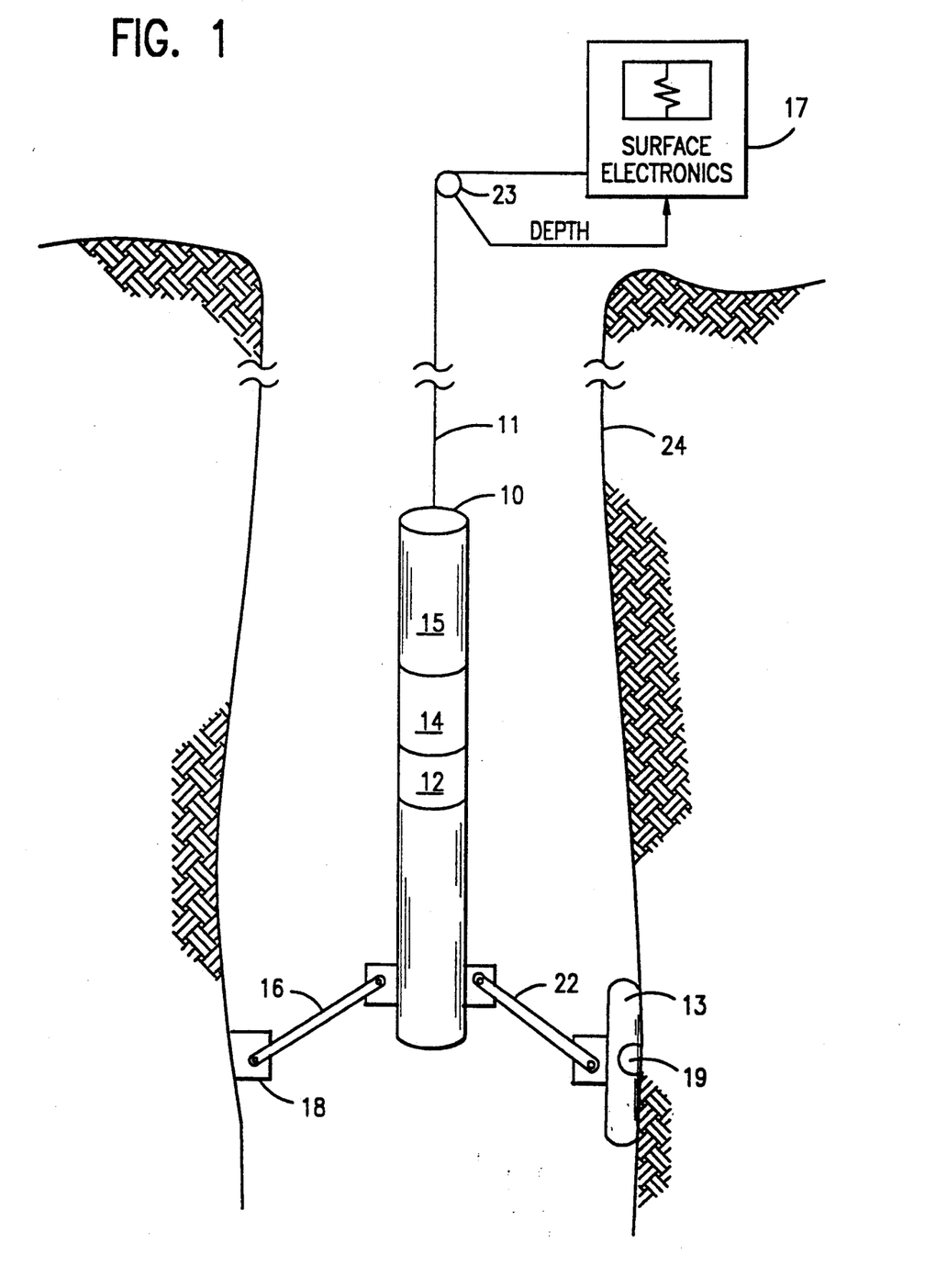
FIG. 1 illustrates a borehole logging system for making die-away measurements of nuclear radiation from a subsurface formation surrounding a borehole and for producing a log of porosity versus depth of such formation.

Referring to FIG. 1, there is illustrated a borehole logging system useful in logging a subsurface formation for porosity in accordance with the present invention.

A borehole tool 10, supported by cable 11, comprises a high energy pulsed neutron source 12 and an articulated radiation detector pad 13. A high-voltage power supply 14 is provided for the source 12 and a downhole electronics unit 15 is provided with circuits for utilization and modification of signals from radiation detector pad 13. Also included are circuits for the control of the high voltage power supply 14. A backup arm 16 with attached pad 18 extending from the logging tool 10 may be included to force the logging tool 10 to follow the average contour of the borehole wall 24. Cable 11 extends to a surface electronics unit 17 where the signals from the radiation detector pad 13 are processed and recorded, along with an indication of depth from a sheave 23, as a porosity log of the subsurface formation.

Particularly troublesome, however, to such a radiation measurement is the presence of rugosity in the borehole wall. Any borehole enlargement of depth greater than about one-eighth inch can seriously affect the formation radiation measurement.

To help eliminate the troublesome borehole rugosity effects on the formation radiation measurement, the radiation detector should be housed in a pad 13 which is small enough to track short borehole enlargements. Most such enlargements can be tracked by a radiation detector pad that is on the order of one foot in length. The radiation detector pad 13 includes at least one epithermal neutron detector 19 which is positioned against one side of pad 13, and a shielding material (i.e., a moderating material with or without an appropriate absorbing material) (not shown) which fills the remaining portion of the pad. Such a detector is illustrated in U.S. Pat. No. 4,581,532 to Givens et al. and in U.S. Pat. No. 4,692,617 to Allen et al., the teachings of which are incorporated herein by reference. The arm 22, shown in FIG. 1, azimuthally orients the pad so that the side of the pad against which the neutron detector is positioned is firmly pressed against the surface of the borehole wall. In this manner, the focusing of the directional sensitivity of the assembly consisting of the neutron detector and the shielding material on the formation is maximized, while the directional sensitivity of such assembly to radiation from the borehole fluid is minimized by the moderation and/or absorption of such borehole fluid radiation by the shielding material. Articulating arm 22 is shown in FIG. 1 for purposes only as one example of a means for positioning the radiation detector against the surface of the borehole wall as is illustrated in the aforementioned U.S. Pat. No. 4,692,617 to Allen et al. Other positioning means may also be acceptable such as by locating the radiation detector in the main body of the logging tool and pressing the tool or that portion of the tool housing the radiation detector against the surface of the borehole wall as shown in the aforementioned U.S. Pat. No. 4,581,532 to Givens et al. or in the aforementioned U.S. Pat. No. 4,972,082 to Loomis et al, the teaching of which is also incorporated herein by reference.

Figure 2:
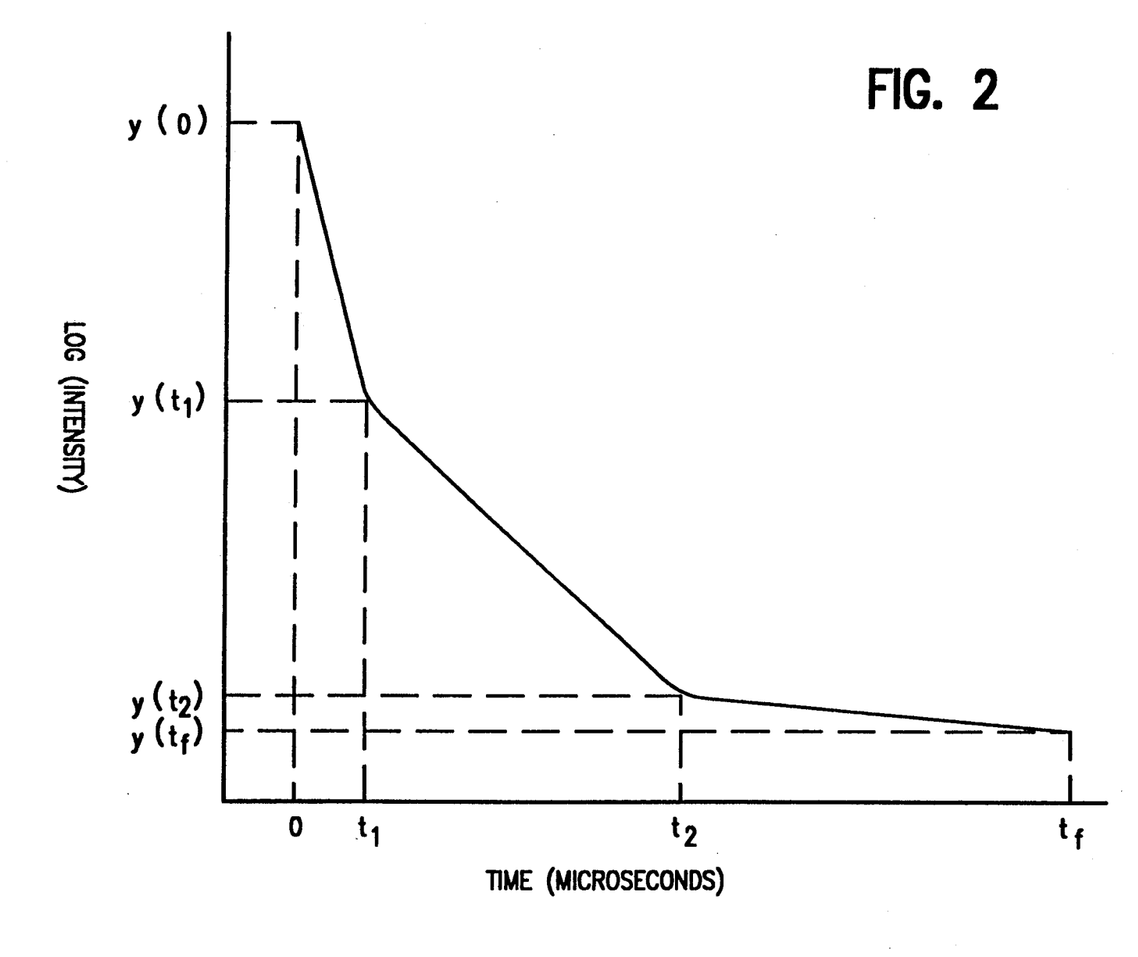
FIG. 2 illustrates a specific example of epithermal neutron die-away measurements as might be made by the borehole logging system of FIG. 1.

Nevertheless, there is still a need for improving on the characterization of the subsurface formation as to porosity in those situations where there is standoff of the neutron detector from the formation, whether due to the pad 13 not being completely in direct contact with the borehole wall or whether due to the entire tool 10 not being in complete contact with the borehole should the articulated pad 13 not be employed and the detector be alternatively housed in the main body of the tool 10. Such improvement, in accordance with a specific feature of the present invention, involves the correcting of the formation decay constant used in producing the porosity log for such detector standoff in accordance with a function relating formation decay constant to the ratio of borehole to formation components of die-away amplitude, particularly where the measured die-away is comprised of a plurality of exponential terms, such as represented by the die-away curve illustrated in FIG. 2. For purposes of illustration, the curve in FIG. 2 is assumed to consist of the sum of two epithermal neutron die-away components and one thermal neutron die-away component. A first exponential die-away component $A_1 e^{-\mu_1 t}$ from 0 to $t_1$ microseconds represents predominantly the rate of die-away of epithermal neutrons attributable to borehole effects. A second exponential die-away component $A_2 e^{-\mu_2 t}$ from $t_1$ to $t_2$ microseconds represents predominantly the rate of die-away of epithermal neutrons attributable to formation effects. A third die-away component $A_3 e^{-\mu_3 t}$ from $t_2$ to $t_f$ microseconds represents predominantly the rate of die-away attributable to thermal neutron effects. Each of these components can frequently be observed as a straight line when total intensity is plotted on a semilogarithmic scale during the time domain when the effect is dominant. For a more detailed description of such a plurality of die-away characteristics, as well as a description of a borehole logging apparatus 10, including surface equipment, for making the die-away data measurements, reference may be had to the aforementioned U.S. Pat. Nos. 4,097,737; 4,556,793; and 4,590,370, the teachings of which are incorporated herein by reference.

Figure 3:
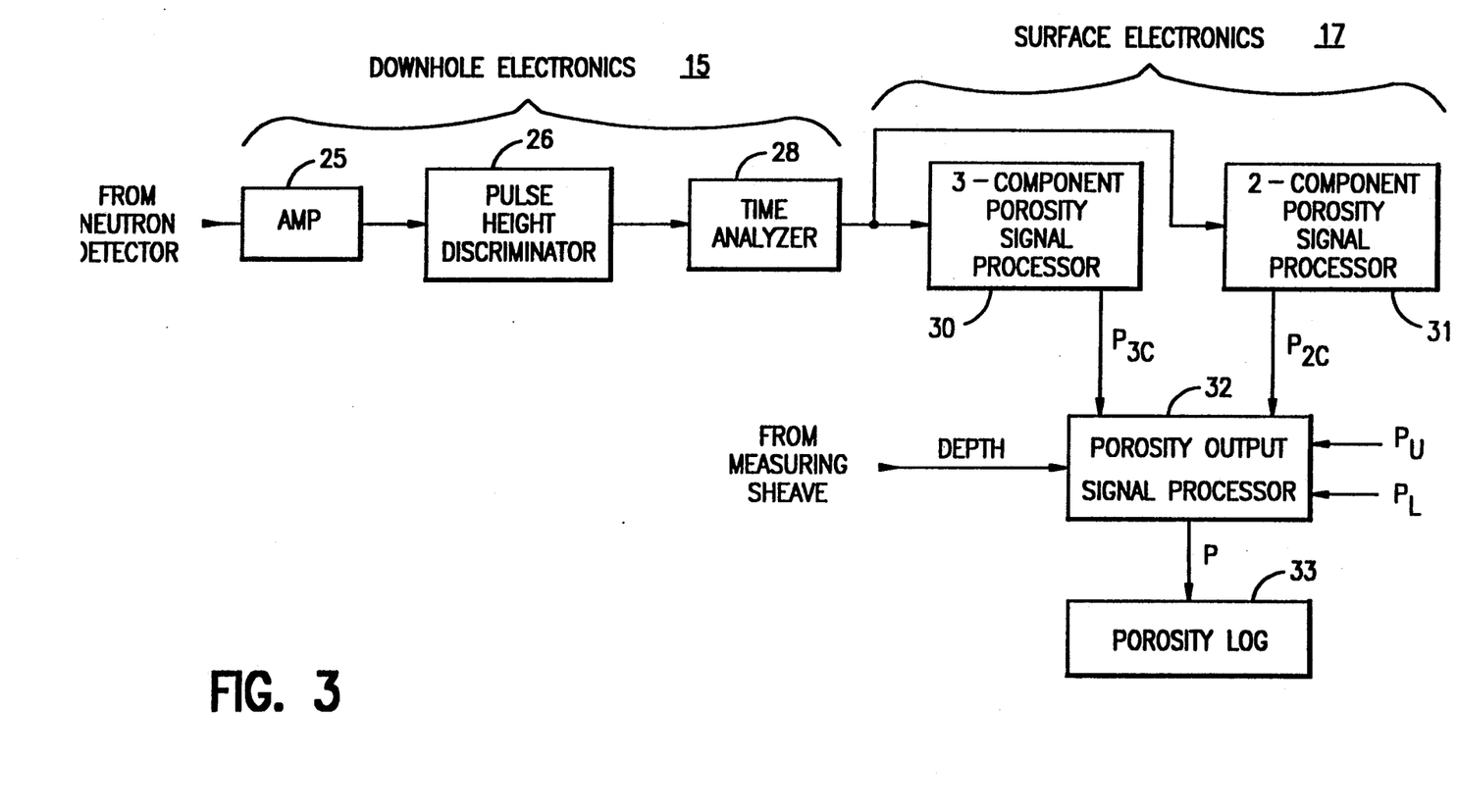
FIG. 3 illustrates the downhole and uphole electronics units of the borehole logging system of FIG. 1.

Referring now to FIG. 3 there is shown the downhole electronics 15 and surface electronics 17 useful for processing the die-away signals from the nuclear detector and producing the desired porosity log corrected for standoff. The die-away signal from the neutron detector within pad 13 of FIG. 1 is applied through amplifier 25 and pulse height discriminator 26 to a time analyzer 28.

Time analyzer 28 stores the incoming die-away signal as a multichannel time sequence of counts representing the die-away spectrum. Preferably this is a sequence of contiguous channels each one microsecond in width, but other recording modes could be used. The die-away signal is accumulated over a time frame of approximately one second and corresponds to approximately 5000 firings of the neutron source. The spectrum thus accumulated is then passed to uphole electronics 17 for processing. The uphole electronics 17 is controlled by a master digital computer (Hewlett Packard Model 1000 for example). In U.S. Pat. No. 5,068,531 to Allen et al., the die-away spectrum from such a time analyzer 28 is passed to a first signal processor (Stage I) which solves equations which relate time moments calculated for the accumulated data spectrum with corresponding time moments calculated for the mathematical model of the die-away process. This solution produces the parameters $A_i$ and $\mu_i$ previously described. The parameters $A_i$ and $\mu_i$ are then passed to a second signal processor (Stage II) where the formation die-away parameter $\mu_2$ is corrected for standoff effects by the ratio R of the amplitude of its borehole die-away component $A_1$, as described above, to the amplitude of its formation component $A_2$. Thereafter a standoff-corrected formation decay constant is produced and applied to a function former unit which utilizes calibration measurements taken in borehole models at known porosities and conditions of detector standoff to produce the desired porosity-versus-depth recording or log.

Details of such electronic signal processing of the die-away spectrum to produce the desired porosity log are set forth in U.S. Pat. No. 5,068,531 and the entire contents of such patent are incorporated herein by reference.

It is a specific feature of the present invention to carry out the electronic signal processing described in U.S. Pat. No. 5,068,531 by means of a trained neural network.

A first neural network produces physical parameters from the data which are sensitive to porosity and standoff. This network is used because it is exceedingly fast computationally. A second neural network combines two parameters from the first stage of analysis to obtain a lifetime correction and apparent standoff. This network is used because the kernel driving the transformation is analytically very difficult to describe. The lifetime correction is appropriately combined with the measured lifetime and converted to porosity by a simple analytical transformation.

The foregoing transformations by two neural networks can clearly be combined into a single network. However, overall accuracy of the training exercise appears to be better in the two-stage approach because the physical model of the die-away process extracts from the input data two parameters which strongly characterize porosity ($\mu_2$) and apparent standoff (R). It should be noted that the reciprocal of the epithermal neutron decay constant $\mu_2$ is a physical parameter called the epithermal neutron lifetime $\tau_2$. In the standoff-correction scheme $\tau_2$ is utilized because the correction is normally a positive value. If desired, the neural network can be trained to produce $\tau_2$ and R rather than $\mu_2$ and R to avoid the conversion.

It should be clear to those skilled in the art that the training of the neural network and the resulting determinations used to produce values of logging tool standoff S and an epithermal neutron lifetime correction factor $\Delta\tau_2$ from the epithermal neutron lifetime $\tau_2$ and amplitude ratio R are well known and need not be reproduced herein. They are readily found, for example, in Chapter 8 of the text *Parallel Distributed Processing*, Volume 1, by D. Rumelhart and J. McClelland, MIT Press. Briefly, however, a neural network consists of a collection of processing elements called neurons arranged in layers. A neuron has multiple inputs, a summing device, and a non-linear thresholding operation on the summed output. Each neuron in a layer is connected with every neuron in an adjacent layer by weight. The first layer is called the input layer and the last layer is called the output layer. Layers of neurons in between are called hidden layers. The network is trained by supplying a set of training data comprising a particular input and its associated desired output pattern to the network. The input is applied to the network and an output computed. An error is found by subtracting this output from the desired output and the weights are then adjusted in the network through a process known as back-propagation to make this error smaller. In operation, the input is fed through the network iteratively and each time the weights are adjusted to make the error smaller until the error reaches some threshold level. Additional data from the training set are fed through the network in the same way and the errors reduced each time. Finally, the network learns to associate a particular input pattern with a particular output pattern.

Neural networks have been used in pattern and voice recognition and in digital signal processing. In using a neural network in the pulsed neutron porosity logging operation of the present invention, the network is trained using the so-called back-propagation algorithm to take input values of epithermal neutron lifetime $\tau_2$ and amplitude ratio R and provide output values of logging tool standoff S and a correction factor $\Delta\tau_2$ which can be added to $\tau_2$ to get standoff-corrected values $\tau_2^*$. Because this calculation of standoff S and standoff-corrected lifetime $\tau_2^*$ is very fast using a neural network, and the conversion of corrected lifetime to porosity involves only a single function, an accurate determination of both porosity and standoff can be made easily in real time as the well log is being recorded.

One example of training data used for a three exponential model of an epithermal neutron die-away process is illustrated below.

Table I illustrates example training data for the neural network; Table II illustrates the network parameters; and Table III illustrates output data from the trained neural network for the example. In Table I the training data are as follows: Column 1 lists porosity of the calibration models, Column 2 lists measured lifetimes at zero standoff, Column 3 lists the amplitude ratio R (here identified as Alpha), Column 4 lists the measured lifetimes at the standoff conditions given in Column 6, Column 5 lists the lifetime correction term. Columns 3 and 4 are thus inputs of the training data and Columns 5 and 6 are the desired outputs. Versions of Columns 3 through 6 suitably scaled for network training appear in Columns 7 through 10. Table II is largely self-explanatory. It indicates that the neural network has four layers consisting of an input layer, an output layer, and two so-called "hidden" layers. There are two inputs and two outputs with six computational nodes in the first "hidden" layer and four in the second. Weight and bias specifications complete the description of the network. Table III lists the output obtained from the trained neural network when the calibration data used in its training is the input: Column 5 lists the lifetime correction term and Column 10 lists the tool standoff. The standoff-corrected lifetime, Column 6, is obtained by adding the corrections in column 5 to the uncorrected lifetimes in column 3 and is compared to the lifetime measured at zero standoff, Column 7, by computing their ratio in Column 8. Standoff determined by the neural network is shown in Column 10 and can be compared with the figures appearing in Column 2.

TABLE I

| POROSITY | TAU3E(0/4) | ALPHA | TAU3E | DELTAU3E | STAND-OFF | ALPHA* | TAU3E* | DELTAU3E* | STAND-OFF* |
|---|---|---|---|---|---|---|---|---|---|
| 1.8 | 18.4932 | 0.8822 | 18.4932 | 0 | 0 | −0.17356 | 0.37466 | −0.3 | −0.25 |
| 18.7 | 6.8584 | 0.3877 | 6.8584 | 0 | 0 | −0.27246 | −0.20708 | −0.3 | −0.25 |
| 26.5 | 5.8255 | 0.1869 | 5.8255 | 0 | 0 | −0.31262 | −0.25873 | −0.3 | −0.25 |
| 40.3 | 4.3838 | 0 | 4.3838 | 0 | 0 | −0.35 | −0.33081 | −0.3 | −0.25 |
| 1.8 | 18.4932 | 1.226 | 14.7188 | 3.7744 | 0.25 | −0.1048 | 0.18594 | −0.48373 | −0.125 |
| 18.7 | 6.8584 | 0.6791 | 6.0352 | 0.8232 | 0.25 | −0.21418 | −0.24824 | −0.24512 | −0.125 |
| 26.5 | 5.8255 | 0.4606 | 5.2539 | 0.5716 | 0.25 | −0.25788 | −0.28731 | −0.261893 | −0.125 |
| 40.3 | 4.3838 | 0.177 | 4.1368 | 0.247 | 0.25 | −0.3146 | −0.34316 | −0.283533 | −0.125 |
| 1.8 | 18.4932 | 1.6586 | 12.2188 | 6.2744 | 0.5 | −0.01828 | 0.06094 | 0.118293 | 0 |
| 18.7 | 6.8584 | 1.1946 | 5.584 | 1.2744 | 0.5 | −0.11108 | −0.2708 | −0.21504 | 0 |
| 26.5 | 5.8255 | 0.8063 | 4.8438 | 0.9817 | 0.5 | −0.18874 | −0.30781 | −0.234553 | 0 |
| 40.3 | 4.3838 | 0.7232 | 4.1875 | 0.1963 | 0.5 | −0.20536 | −0.34063 | −0.286913 | 0 |
| 1.8 | 18.4932 | 2.615 | 9.1973 | 9.2959 | 1 | 0.173 | −0.09014 | 0.319727 | 0.25 |
| 18.7 | 6.8584 | 2.8451 | 5.5078 | 1.3506 | 1 | 0.21902 | −0.27461 | −0.20996 | 0.25 |
| 26.5 | 5.8255 | 2.8789 | 5.2188 | 0.6067 | 1 | 0.22578 | −0.28906 | −0.259553 | 0.25 |
| 40.3 | 4.3838 | 3.3038 | 4.8867 | −0.5029 | 1 | 0.31076 | −0.30567 | −0.333527 | 0.25 |

TABLE II

| | | | | | |
|---|---|---|---|---|---|
| Network name: | at_dts8.net | | | | |
| Network layers: | 4 | | | | |
| Layer dimensions: | | | | | |
| layer 1: | 2 | | | | |
| layer 2: | 6 | | | | |
| layer 3: | 4 | | | | |
| layer 4: | 2 | | | | |
| Cycles trained: | 389328 | | | | |
| Weights initialized from −0.300000 to 0.300000 | | | | | |
| Noise: 0.000000. Decay: 0.000000 | | | | | |
| Learning rates: | | | | | |
| layer 2: | 2.000000 | | | | |
| layer 3: | 2.000000 | | | | |
| layer 4: | 2.000000 | | | | |
| Momentum terms: | | | | | |
| layer 2: | 0.800000 | | | | |
| layer 3: | 0.800000 | | | | |
| layer 4: | 0.800000 | | | | |
| Layer 2 biases: | | | | | |
| −2.517196 | −0.414389 | −2.684155 | 1.372130 | −2.945600 | 3.109718 |
| Layer 3 biases: | | | | | |
| −4.794534 | 0.418255 | −1.748318 | 0.690356 | | |
| Layer 4 biases: | | | | | |
| −4.596799 | −1.594935 | | | | |
| Layer 1 to layer 2 weights: | | | | | |
| 0.916544 | −6.208319 | 6.427018 | −4.098271 | 10.101479 | −5.903040 |
| 8.857375 | −7.860291 | −2.030396 | 21.321926 | −1.369920 | 4.651538 |
| Layer 2 to layer 3 weights: | | | | | |
| 5.031387 | −1.240643 | 4.144804 | 3.924167 | 2.057790 | −0.975195 |
| −7.875674 | 3.657824 | 0.026516 | −6.422636 | 6.654104 | 4.918244 |
| 3.928713 | −2.622469 | 2.040396 | 6.355948 | −2.524712 | −3.536021 |
| 6.635888 | 3.497980 | −1.244142 | −2.684376 | 0.042426 | 0.273035 |
| Layer 3 to layer 4 weights: | | | | | |
| 11.235277 | 4.946550 | −2.434103 | −1.889393 | 4.572870 | 2.783114 |
| 6.063582 | −6.635078 | | | | |

TABLE III

| POROSITY | STAND-OFF | TAU3E | DELTAU* | DELTAU | TAU3E (COR) | TAU3E (0/4) | RATIO | STAND-OFF* | STAND-OFF |
|---|---|---|---|---|---|---|---|---|---|
| 1.8 | 0 | 18.4932 | −0.30026 | −0.003945 | 18.489255 | 18.4932 | 0.99978668 | −0.249742 | 0.000516 |
| 18.7 | 0 | 6.8584 | −0.2984 | 0.024015 | 6.882415 | 6.8584 | 1.00350155 | −0.245668 | 0.008664 |
| 26.5 | 0 | 5.8255 | −0.30174 | −0.026055 | 5.799445 | 5.8255 | 0.99552742 | −0.261719 | −0.023438 |

TABLE III-continued

| PO-ROSITY | STAND-OFF | TAU3E | DELTAU* | DELTAU | TAU3E (COR) | TAU3E (0/4) | RATIO | STAND-OFF* | STAND-OFF |
|---|---|---|---|---|---|---|---|---|---|
| 40.3 | 0 | 4.3838 | −0.29535 | 0.06981 | 4.45361 | 4.3838 | 1.01592454 | −0.238218 | 0.023564 |
| 1.8 | 0.25 | 14.7188 | −0.04813 | 3.77799 | 18.49679 | 18.4932 | 1.00019413 | −0.125226 | 0.249548 |
| 18.7 | 0.25 | 6.0352 | −0.24572 | 0.81417 | 6.84937 | 6.8584 | 0.99868337 | −0.117879 | 0.264242 |
| 26.5 | 0.25 | 5.2539 | −0.26548 | 0.517785 | 5.771685 | 5.8255 | 0.99076217 | −0.129312 | 0.241376 |
| 40.3 | 0.25 | 4.1368 | −0.28618 | 0.20736 | 4.34416 | 4.3838 | 0.99095762 | −0.132637 | 0.234726 |
| 1.8 | 0.5 | 12.2188 | 0.118076 | 6.27114 | 18.48994 | 18.4932 | 0.99982372 | −0.000026 | 0.499948 |
| 18.7 | 0.5 | 5.584 | −0.21167 | 1.324935 | 6.908935 | 6.8584 | 1.00736834 | −0.002845 | 0.49431 |
| 26.5 | 0.5 | 4.8438 | −0.2357 | 0.964515 | 5.808315 | 5.8255 | 0.99705004 | 0.0002 | 0.5004 |
| 40.3 | 0.5 | 4.1875 | −0.28679 | 0.19815 | 4.38565 | 4.3838 | 1.00042201 | 0.003209 | 0.506418 |
| 1.8 | 1 | 9.1973 | 0.319218 | 9.28827 | 18.48557 | 18.4932 | 0.99958742 | 0.249814 | 0.999628 |
| 18.7 | 1 | 5.5078 | −0.21014 | 1.34784 | 6.85564 | 6.8584 | 0.99959757 | 0.254361 | 1.008722 |
| 26.5 | 1 | 5.2188 | −0.25852 | 0.62214 | 5.84094 | 5.8255 | 1.00265042 | 0.245244 | 0.990488 |
| 40.3 | 1 | 4.8867 | −0.3341 | −0.511485 | 4.375215 | 4.3838 | 0.99804165 | 0.250669 | 1.001338 |

Because neural networks are very fast computationally, it is practical to determine corrected porosity and standoff by both the three-component exponential model and the two-component exponential model (described in detail in U.S. Pat. No. 5,068,531) each time a new set of moments are computed from the die-away spectrum. This feature of the present invention is shown in FIG. 3 wherein the die-away spectrum from time analyzer 28 is applied simultaneously to a three-component porosity signal processor 30 and a two-component porosity signal processor 31. The outputs of signal processors 30 and 31 are then spliced together or merged over a small range of porosities by use of a suitable smoothing function employed by the porosity output signal processor 32. The lower and upper porosity limits for such u- merging are predetermined by inputs $P_L$ and $P_U$ to signal processor 32. The porosity output from signal processor 32 is then recorded versus borehole depth as the desired porosity log 33 corrected for detector standoff.

Figure 4:
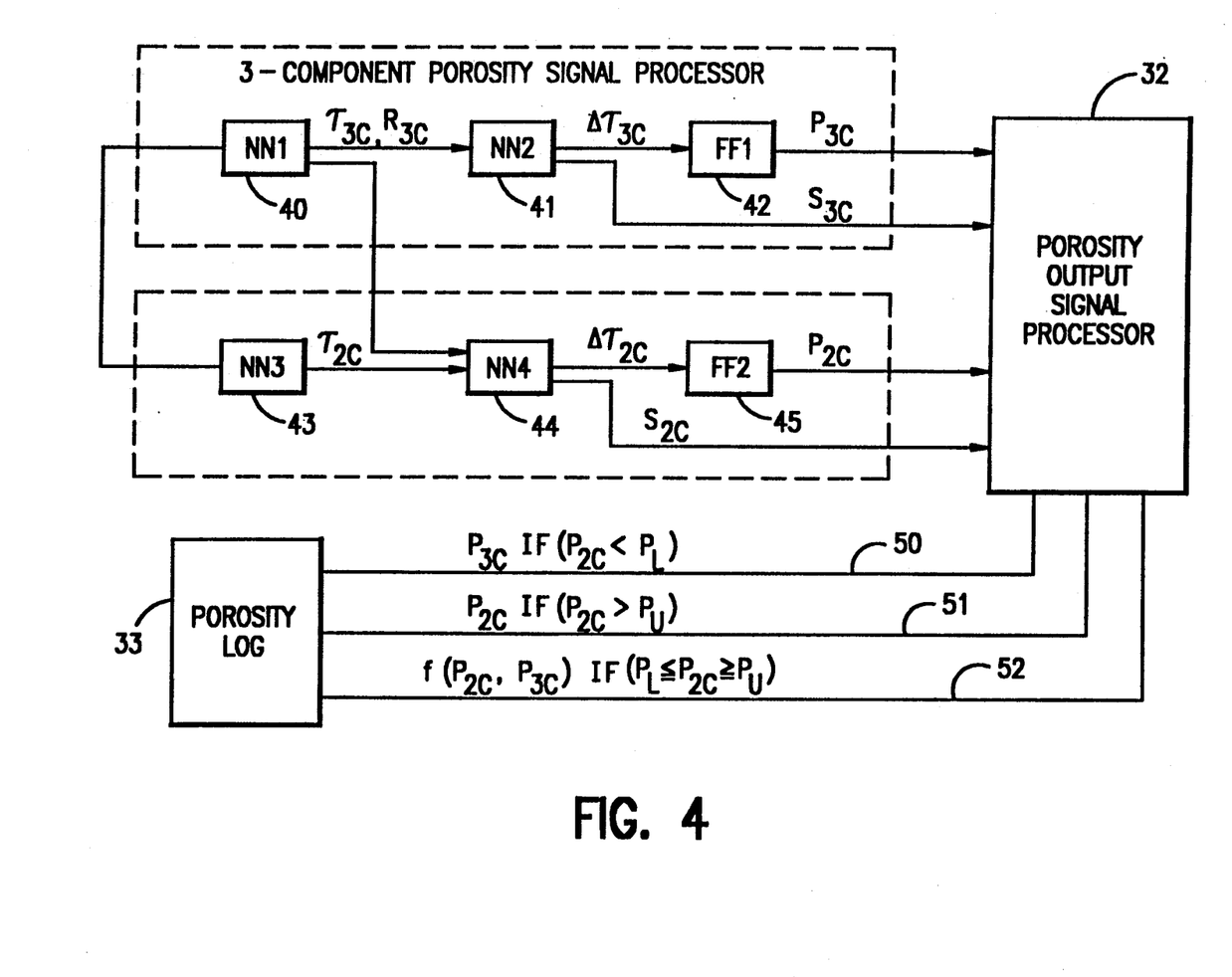
FIG. 4 illustrates in more detail the uphole electronics units of FIG. 3.

Referring now to FIG. 4, the operation of the signal processors 30-32 in accordance with the teaching of the present invention is shown in more detail. Referring firstly to the three-component porosity signal processor 30, a first neural network 40 is trained to produce from the die-away intensity an initial three-component formation decay constant signal, a ratio of the borehole amplitude to formation amplitude components of said intensity signals $R_{3c}$; and a ratio of the background amplitude to formation amplitude components of said intensity signals. A three-component formation epithermal lifetime signal ($\tau_{3c}$) is obtained as the reciprocal of the three-component formation decay constant signal. A second neural network 41 is trained to produce a three-component epithermal neutron lifetime correction signal $\Delta\tau_{3c}$ and three-component apparent standoff signal $S_{3c}$ from the three-component epithermal neutron lifetime signal and the amplitude ratio. A first function former 42 adds the correction term $\Delta\tau_{3c}$ to the lifetime $\tau_{3c}$ to obtain a standoff-corrected lifetime $\tau_{3c}^*$, and then produces a three-component porosity $P_{3c}$ based on calibration data taken in borehole models of known porosity.

In a related way, two-component signal processor 31 processes data from the analyzer 28 to get $\tau_{2c}$ from the third neural network 43. This parameter and $R_{3c}$ from signal processor 30 are then fed to the fourth neural network 44 to produce $\Delta\tau_{2c}$ and $S_{2c}$. A second function former 45 adds the correction term $\Delta\tau_{2c}$ to the two-component lifetime $\tau_{2c}$ to obtain a standoff-corrected lifetime $\tau_{2c}^*$, and then produces a two-component porosit $P_{2c}$ based on calibration data taken in borehole models of known porosity.

Both porosity signals $P_{2c}$ and $P_{3c}$ are applied along with predetermined upper and lower porosity limits, $P_U$ and $P_L$ respectively, to the porosity output signal processor 32. The porosity output to porosity log 33 is the three-component porosity signal $P_{3c}$ on line 50 if signal processor 32 determines that the two-component porosity signal $P_{2c}$ is less than the predetermined lower porosity limit $P_L$. The porosity output to porosity log 33 is the two-component porosity signal $P_{2c}$ on line 51 if signal processor 32 determines that the two-component porosity signal $P_{2c}$ is greater than the predetermined upper porosity limit $P_U$. The two- and three-component porosity signals $P_{2c}$ and $P_{3c}$ are combined and applied to porosity log 33 on line 52 in accordance with a function $f(P_{2c}, P_{3c})$ if the two-component porosity signal $P_{2c}$ is equal to or greater than the lower porosity limit $P_U$ and equal to or less than the upper porosity limit $P_L$. Preferably the porosity signal represented by the function $f(P_{2c}, P_{3c})$ is a weighted average of the two- and three-component porosity signals. In accordance with the present invention, signal processor 32 employs a smoothing function to produce this weighted average. A particularly suitable smoothing function is the sigmoid function $S(x)$ defined such that $S(x)$ is bounded between zero and unity:

$$S(x) = \frac{1}{1 + e^{-x}} \quad (1)$$

This function $S(x)$ is utilized as follows:

$$P = P_{2c}S(P_{2c}) + P_{3c}[1 - S(P_{2c})], \quad (2)$$

where P is the output porosity on line 52 to the porosity log 33 and $S(P_{2c})$ is:

$$S(P_{2c}) = \frac{1}{1 + e^{-2.302(P_{2c} - 22)}} \quad (3)$$

The form of $S(P_{2c})$ is chosen to make the output porosity P more than 99% of $P_{3c}$ for values of $P_{2c}$ less than 20 porosity units and more than 99% of $P_{2c}$ for values of $P_{2c}$ greater than 24 porosity units. The mix is 50:50 at 22 porosity units.

It should be noted that neural networks 41 and 44 are trained to produce no correction for standoff when porosity is 100%. This choice assures that the system will give the proper response when the tool is placed in a large body of pure water. The choice also limits standoff sensitivity in the very high porosity range, but is of little practical significance because there are very few real formations having porosities exceeding roughly 60%.

Finally, it should be noted that neural networks 40 and 43 are both trained for definition purposes to produce background-to-formation amplitude ratios although this information is not used in subsequent data processing.

Having now described the present invention in conjunction with a preferred embodiment, it is to be understood that various modifications and alternations may be apparent within the spirit and scope of the invention as set forth in the appended claims.

We claim:

1. Apparatus for converting die-away signals representing the die-away of nuclear radiation in a subsurface formation surrounding a borehole into a log representing porosity versus depth within said formation corrected for the effect of detector standoff from the borehole wall, comprising:
   a) a borehole logging tool,
   b) means for traversing said logging tool along said borehole,
   c) a pulsed source of fast neutrons within said logging tool for irradiating the formation surrounding a borehole with fast neutrons,
   d) at least one directionally sensitive radiation detector assembly having a neutron detector for measuring the die-away of secondary radiation produced by the fast neutrons which return to the borehole from the irradiated formation,
   e) means for positioning said radiation detector assembly so that it contacts the surface of the borehole wall and is oriented to position the neutron detector to maximize directional sensitivity of the neutron detector to the die-away of secondary radiation from the formation at the point of contact of the radiation detector assembly with the borehole wall and to minimize directional sensitivity to the die-away of secondary radiation from the borehole fluid,
   f) means for producing intensity signals representative of the die-away of secondary radiation measured by said detector as said logging tool traverses said borehole,
   g) a signal processor comprising:
      i) a first trained neural network to produce an initial formation decay constant signal from said intensity signals and to produce a ratio of the borehole amplitude to formation amplitude components of said intensity signals,
      ii) means for converting the formation decay constant signal to its reciprocal, an epithermal neutron lifetime signal,
      iii) a second trained neural network to produce an epithermal neutron lifetime correction signal and apparent standoff signal from said epithermal neutron lifetime signal and said amplitude ratio,
      iv) means for producing a standoff-corrected epithermal neutron lifetime signal from said epithermal neutron lifetime signal and said epithermal neutron lifetime correction signal to correct for standoff from the borehole wall encountered by said detector as said logging tool traverses said borehole,
      v) means for generating a porosity signal from said standoff-corrected epithermal neutron lifetime signal derived from measurements in borehole models at known porosities and conditions of detector standoff, and
   h) means for generating a log of said porosity signal versus depth as said logging tool traverses along said borehole.

2. Apparatus for converting die-away signals representing the die-away of nuclear radiation in a subsurface formation surrounding a borehole into a log representing porosity versus depth within said formation corrected for the effect of detector standoff from the borehole wall, comprising:
   a) a borehole logging tool,
   b) means for traversing said logging tool along said borehole,
   c) a pulsed source of fast neutrons within said logging tool for irradiating the formation surrounding a borehole with fast neutrons,
   d) at least one directionally sensitive radiation detector assembly having a neutron detector for measuring the die-away of secondary radiation produced by the fast neutrons which return to the borehole from the irradiated formation,
   e) means for positioning said radiation detector assembly so that it contacts the surface of the borehole wall and is oriented to position the neutron detector to maximize directional sensitivity of the neutron detector to the die-away of secondary radiation from the formation at the point of contact of the radiation detector assembly with the borehole wall and to minimize directional sensitivity to the die-away of secondary radiation from the borehole fluid,
   f) means for producing intensity signals representative of the die-away of secondary radiation measured by said detector as said logging tool traverses said borehole,
   g) a three-component signal processor comprising:
      i) a first trained neural network to produce an initial three-component formation decay constant signal from borehole, formation, and background components of said intensity signals and to produce a ratio of the borehole amplitude to formation amplitude components of said intensity signals,
      ii) means for converting the formation decay constant signal to its reciprocal, an epithermal neutron lifetime signal,
      iii) a second trained neural network to produce a three-component epithermal neutron lifetime correction signal and three-component apparent standoff signal from said three-component epithermal neutron lifetime signal and said amplitude ratio,
      iv) means for producing a three-component standoff-corrected epithermal neutron lifetime signal from said three-component epithermal neutron lifetime signal and said three-component epithermal neutron lifetime correction signal to correct for standoff from the borehole wall encountered by said detector as said logging tool traverses said borehole,
      v) means for generating a three-component porosity signal from said three-component standoff-corrected epithermal neutron lifetime signal derived from measurements in borehole models at known porosities and conditions of detector standoff, and
   h) a two-component signal processor comprising:

i) a third trained neural network to produce a two-component initial formation decay constant signal from formation and background components of said intensity signals, ii) means for converting the formation decay constant signal to its reciprocal, a formation epithermal neutron lifetime signal, iii) a fourth trained neural network to produce a two-component epithermal neutron lifetime correction signal and two-component apparent standoff signal from said two-component epithermal neutron lifetime signal and said three-component amplitude ratio, iv) means for producing a two-component standoff-corrected epithermal neutron lifetime signal from said two-component epithermal neutron lifetime signal and said two-component epithermal neutron lifetime correction signal to correct for standoff from the borehole wall encountered by said detector as said logging tool traverses said borehole, v) means for generating a two-component porosity signal from said two-component standoff-corrected epithermal neutron lifetime derived from measurements in borehole models at known porosities and conditions of detector standoff, and j) a porosity output signal processor for comparing said three-component porosity signal with said two-component porosity signal and for:

i) producing a log of said three-component porosity signal versus depth within said formation as said logging tool traverses said borehole if said two-component porosity signal is less than a lower porosity limit, ii) producing a log of said two-component porosity signal versus depth within said formation as said logging tool traverses said borehole if said two-component porosity signal is greater than an upper porosity limit, and iii) producing an output porosity signal that is a function of said two-component and three-component porosity signals if said two-component porosity signal is greater than said lower porosity limit and less than said upper porosity limit and producing a log of said output porosity signal versus depth within said formation as said logging tool traverses said borehole.

3. The apparatus of claim 2 wherein said porosity output signal processor merges said three-component and two-component porosity signals over the range bounded by said lower and upper porosity limits in accordance with the following smoothing function:

$$P = S(P_{2c}, P_{3c})$$

where
P = output porosity signal
$P_{2c}$ = two-component porosity signal
$P_{3c}$ = three-component porosity signal
S = smoothing function 4. The apparatus of claim 3 wherein said smoothing function produces said output porosity signal based upon a weighted average of said two-component and three-component porosities.

5. The apparatus of claim 4 wherein said smoothing function is a sigmoid function.

6. The apparatus of claim 3 wherein said range is in the order of 20% porosity for said lower porosity limit and 24% porosity for said upper porosity limit.

7. The apparatus of claim 3 wherein said porosity output signal processor splices said three-component and two-component porosities at a select porosity between said lower and upper porosity limits to produce said output porosity signal.

8. A method for converting signals representing the die-away of nuclear radiation in a subsurface formation surrounding a borehole into a log representing porosity versus depth within said formation corrected for the effect of detector standoff from the borehole wall, comprising the steps of:

a) lowering a logging tool having a neutron source and a directionally sensitive radiation detector into said borehole, b) positioning said radiation detector so that it contacts the surface of the borehole wall and is oriented to maximize directional sensitivity to the die-away of secondary radiation from the formation at the point of contact with the borehole wall and to minimize directional sensitivity to the die-away of secondary radiation from the borehole fluid, c) traversing said logging tool along said borehole, d) irradiating said subsurface formation with neutrons from said neutron source as said logging tool is traversed along said subsurface formation, e) recording die-away signals representing the die-away of nuclear radiation in said subsurface formation as detected by said neutron detector.

f) producing intensity signals, representative of the die-away of secondary radiation measured by said detector as said logging tool traverses said borehole, g) utilizing a trained first neural network for producing an initial formation decay constant signal from said intensity signals and for producing a ratio of the borehole amplitude to formation amplitude components of said intensity signals.

h) converting the formation decay constant signal to its reciprocal, an epithermal neutron lifetime signal, i) utilizing a second trained neural network for producing an epithermal neutron lifetime correction signal and apparent standoff signal from said epithermal neutron lifetime signal and said amplitude ratio, j) producing a standoff-corrected epithermal neutron lifetime signal from said epithermal neutron lifetime signal and said epithermal neutron lifetime correction signal to correct for standoff from the borehole wall encountered by said detector as said logging tool traverses said borehole, k) generating a porosity signal from said standoff-corrected epithermal neutron lifetime signal derived from measurements in borehole models at known porosities and conditions of detector standoff, and l) generating a log of said porosity signal versus depth as said logging tool traverses along said borehole.

9. A method for converting signals representing the die-away of nuclear radiation in a subsurface formation surrounding a borehole into a log representing porosity versus depth within said formation corrected for the effect of detector standoff from the borehole wall, comprising the steps of:

a) lowering a logging tool having a neutron source and a directionally sensitive radiation detector into said borehole, b) positioning said radiation detector so that it contacts the surface of the borehole wall and is oriented to maximize directional sensitivity to the die-away of secondary radiation from the formation at the point of contact with the borehole wall and to minimize directional sensitivity to the die-away of secondary radiation from the borehole fluid, c) traversing said logging tool along said borehole, d) irradiating said subsurface formation with neutrons from said neutron source as said logging tool is traversed along said subsurface formation, e) recording die-away signals representing the die-away of nuclear radiation in said subsurface formation as detected by said neutron detector.

f) producing intensity signals, representative of the die-away of secondary radiation measured by said detector as said logging tool traverses said borehole, g) utilizing a first trained neural network for producing an initial three-component formation decay constant signal from borehole, formation, and background components of said intensity signals and for producing a ratio of the borehole amplitude to formation amplitude components of said intensity signals, h) converting the formation decay constant signal to its reciprocal, an epithermal neutron lifetime signal, i) utilizing a second trained neural network for producing a three-component epithermal neutron lifetime correction signal and three-component apparent standoff signal from said three-component epithermal neutron lifetime signal and said amplitude ratio, j) producing a three-component standoff-corrected epithermal neutron lifetime signal from said three-component epithermal neutron lifetime signal and said three-component epithermal neutron lifetime correction signal to correct for standoff from the borehole wall encountered by said detector as said logging tool traverses said borehole, k) producing a three-component porosity signal from said three-component standoff-corrected epithermal neutron lifetime signal derived from measurements in borehole models at known porosities and conditions of detector standoff, l) utilizing a third trained neural network for producing a two-component initial formation decay constant signal from formation and background components of said intensity signals and for converting the formation decay constant signal to its reciprocal, a formation epithermal neutron lifetime signal, m) utilizing a fourth trained neural network for producing a two-component epithermal neutron lifetime correction signal and two-component apparent signal standoff form sad two-component epithermal neutron lifetime signal and said three-component amplitude ratio, n) producing a two-component standoff-corrected epithermal neutron lifetime signal from said two-component epithermal neutron lifetime signal and correction signal to correct for standoff form the borehole wall encountered by detector as said logging tool traverses said borehole, o) generating a two-component porosity signal from said two-component standoff-corrected epithermal neutron lifetime derived from measurements in borehole models at known porosities and conditions of detector standoff, p) producing a log of said three-component porosity signal versus depth within said formation as said logging tool traverses said borehole if said two-component porosity signal is less than a lower porosity limit, q) producing a log of said two-component porosity signal versus depth within said formation as said logging tool traverses said borehole if said two-component porosity signal is greater than an upper porosity limit, and r) producing an output porosity signal that is a function of aid two-component and three-component porosity signals if said two-component porosity signal is greater than said lower porosity limit and less than said upper porosity limit and producing a log of sad output porosity signal versus depth within said formation as said logging tool traverses said borehole.

10. The method of claim 9 wherein said three-component porosity signal and said two-component porosity signal are merged over a range bounded by said lower and upper porosity limits in accordance with the following smoothing function:

$$P = S(P_{2c}, P_{3c})$$

where
  $P$ = output porosity signal,
  $P_{2c}$ = two-component porosity signal,
  $P_{3c}$ = three-component porosity signal, and
  $S$ = smoothing function 11. The method of claim 10 wherein said smoothing function produces said output porosity signal based upon a weighted average of said two-component and three-component porosities.

12. The method of claim 11 wherein said smoothing function is a sigmoid function.

13. The method of claim 10 wherein said range is in the order of 20% porosity for said lower porosity limit and 24% porosity for said upper porosity limit.

14. The method of claim 10 wherein said three-component and two-component porosities are spliced at a select porosity between said lower and upper porosity limits to produce said output porosity signal.

* * * * *